March 9, 1943.  J. STEKLIK  2,313,208
RANGE FINDER
Filed Jan. 26, 1940  2 Sheets-Sheet 1
Fig. 1
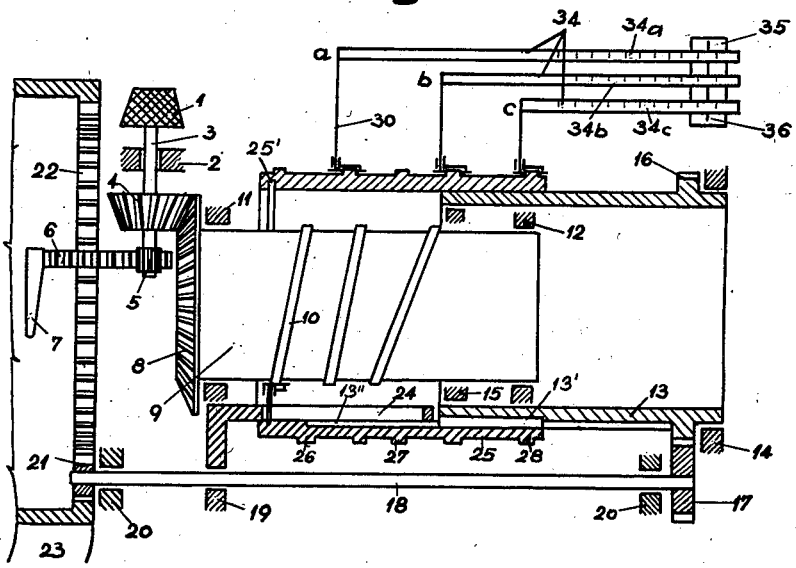
Fig. 2
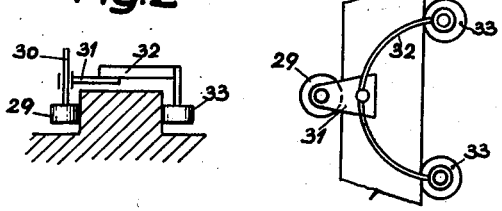
Fig. 3
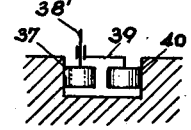
Fig. 4
Fig. 5
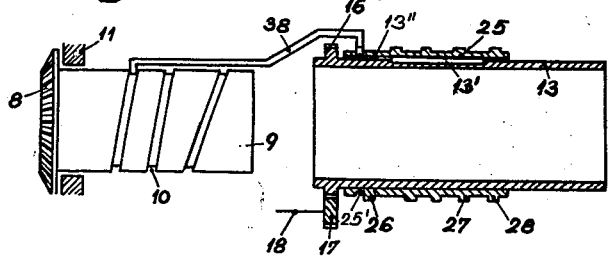
Inventor
Jan Steklik March 9, 1943.                J. STEKLIK                 2,313,208
                             RANGE FINDER
                  Filed Jan. 26, 1940        2 Sheets-Sheet 2

Inventor
Jan Steklik
by Chubbuck & Michaels
atty.

Patented Mar. 9, 1943

2,313,208

UNITED STATES PATENT OFFICE 2,313,208

RANGE FINDER

Jan Steklík, Prerov, Moravia; vested in the Alien Property Custodian

Application January 26, 1940, Serial No. 315,773
In Czechoslovakia January 5, 1939

7 Claims. (Cl. 235—61.5)

My invention relates to range finders and more particularly to range finders with a self-contained virtual basis.

It is an object of my invention to combine such range finders with a device which allows one to simultaneously read off two coordinates of an aerial target, i. e. the altitude and the horizontal or topographical distance.

Other objects of my invention will appear as the specification proceeds.

Range finders with an altitude measuring device, which ascertain the direct distance as well as the rectangular coordinates of the target, are known to operate by utilizing the valid equation $$H = D \sin \alpha$$

which by logarithmation is converted into the equation $$\log H = \log D + \log \sin \alpha$$

H being the altitude, $\alpha$ the altitude angle and D the direct distance of the target as illustrated by Fig. 7 of the drawings attached to this specification.

The topographical or map distance is obtained in a similar manner according to the equation $$L = D \cos \alpha$$

by logarithmation to $$\log L = \log D + \log \cos \alpha$$

The corresponding measuring device operates in such manner that by every turning of the range adjustment knob of the range finder a derivation prism is forced to shift in accordance with the distance of the target and that during such a shift the direct-distance measure with the scale is simultaneously operated by being shifted along and in parallel with the axis of a position-drum on which the curves of the abac are plotted, which correspond to said logarithmic values of the position angle and the direct distance, respectively. The position-drum is rotatably and positively connected with the device for adjusting the position angle. The altitude or the horizontal distance of the target is determined with these devices by the reading of values which are given by the intersection of the distance measure with the corresponding curve of the abac. A drawback of this device is the difficult and inaccurate determination of the values, more particularly in the border zones of the cylinder, in which the curves are nearly parallel to the distance measure, i. e. when reading the smallest values.

In another known device the values ascertained are obtained by mechanically adding the shift of two abacs with scales, one of which is adjusted in dependency on the distance of the target, while the second abac is positively connected with the device for adjusting the position angle. A drawback of this device is the difficult production of the abac which as a rule must be made of a wound metal sheet, the edges of which are connected by strips. The connection of the two edges is however often inaccurate, which causes erroneous determinations or transmission of the values desired.

The disadvantages presented by these known range finders with a self-contained virtual basis and with two elements, one of which is positively connected with the adjusting mechanism for the direct distance of the aerial target, while the second is adjusted in dependency on the momentary position angle, are overcome by the present invention in which both adjusting elements simultaneously control the motion of a third adjustable element which is provided with control cam members, each of which controls the longitudinal shift of independent scales which are preferably arranged above each other and allow to read off the rectangular coordinates as well as the direct distance of the target. The values can therefore be read directly on the scales with the aid of a fixed pointer. The reading is however more accurate if the adjustment of the position-drum is made dependent on the adjustment of the position angle by a transmission with a ratio greater than 1:4. Such an arrangement of the transmission was impossible when using the prior position abacs, with which at a greater transmission the corresponding curve would cut through the direct-distance measure at some places.

The elements which control the motion of the third element with the cam members for the controlling of the motions of the scales are preferably cylinders. According to one modification of the invention all cylinders are hollow and of different diameters and are concentrically arranged. I thereby obtain a compact construction and a favorable arrangement for the elements which transmit the movements to the cylinder to which the cam members are applied which control the shifting movements of the scale.

According to another modification of the invention the distance cylinder is arranged sideways of that cylinder which turns in dependency on the adjustment of the position angle and coaxially with which is arranged the position-drum with the cam members which control the shifting motion of the scales.

In the drawings affixed to this specification and forming part thereof two range finders with deviation prisms embodying my invention are illustrated diagrammatically by way of example.

In the drawings:

Fig. 1 is a partial view of a range finder with concentrically arranged cylinders; some parts are shown in longitudinal section and the device which transmits to the distance cylinder the shifting movements of the deviation prism is illustrated more in detail.

Fig. 2 is a front sectional view and

Fig. 3 is a top plan sectional view on a larger scale of the guide roller devices riding on the projecting cam members.

Fig. 4 is a modified form of a guide roller device which is suitable for cooperation with a cam groove.

Fig. 5 is a diagrammatic showing of a modified range finder according to this invention in which the position drum is arranged sideways of the distance cylinder.

Figure 7:
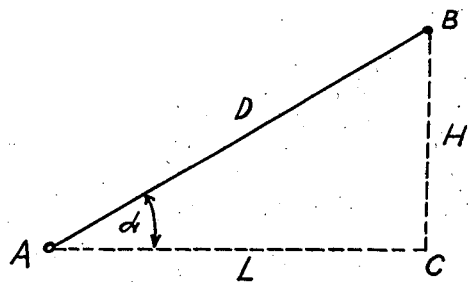
Fig. 7 is a diagram of the distance and the coordinates of an aerial target B to be measured by an observer located at A.
Figure 6:
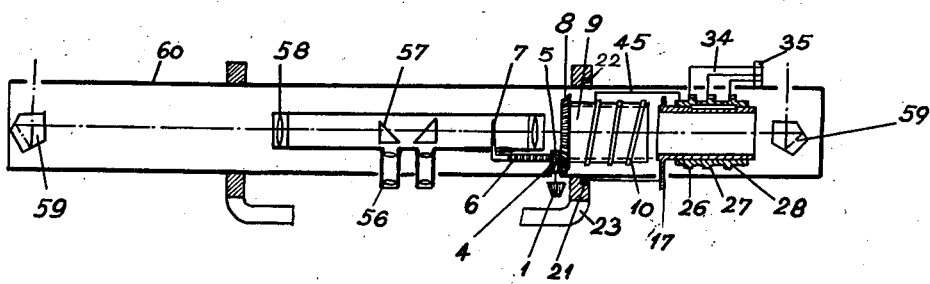
Fig. 6 shows a device according to Fig. 5 in combination with a stereoscopic range finder with deviation prism.

Referring to the drawings and first to Fig. 6 which illustrates a stereoscopic range finder, 60 is the casing of the range finder which is mounted on a fork 23 carried by a stand. At either end of the casing is arranged a pentagonal prism 59, while in the middle of the casing objectives 58, prisms 57 and eye-pieces 56 are arranged. Between one of the objectives and one prism is arranged a displaceable deviation prism 7 supported by a rack 6 (see Fig. 1) which can be displaced by a pinion 5 fixed on the spindle 3 which is operated by a knob 1. On the spindle 3 supported in a bearing 2 is further fixed a bevel gear 4 which engages in a bevel rim 8 of a drum 9 which is adjusted in dependency on the distance of the target and on whose wall is arranged a cam member 10 having the form of a helix of non-constant pitch proportional to the log of the range of the aerial target.

In the modification shown in Fig. 1 the drum 9, which is called the distance-drum, is rotatably supported in bearings 11 and 12 within a hollow supporting drum 13 which is rotatably arranged in bearings 14 and 15 and rotates in dependency on changes of the position angle. Near one end there is fixed on the drum 13 a toothed rim 16 engaging in a spur gear 17 mounted on a spindle 18 supported in bearings 19 and 20. On the other end of the spindle 18 is mounted a pinion 21 engaging the internally toothed rim 22 of one arm of the fork 23 carrying the range finder (see Fig. 6).

On the supporting drum 13 is mounted a drum 25, called the position-drum, which is connected by a key and slot connection 13' with drum 13 for common rotation.

The position-drum 25 receives, in addition to the rotary movement, an axial movement in dependency on the position of the cam members 10. The transmission of the movement of the distance-drum 9 or of its cam member 10 to the position-drum 25 is carried out during rotation with the aid of a roller member which in Figs. 2 and 3 is shown more in detail. This roller member consists of a guide roller 29 rotatably arranged on the carrier 30 and of two yieldingly connected supporting rollers 33 which can be tilted by the part 31 with the aid of spring 32. The holder 30 extends through the slot 24 formed in an extension 24' of the fixed part of the apparatus into an annular groove 25' of the position-drum 25 so that the position drum 25 is displaced axially during rotation of drum 9. The transmission of the axial movement of the position drum 25 with respect to drum 13 is rendered possible by the provision of a groove 13'' and key 13'.

From the circumference of the position-drum there project cam members 26, 27 and a circular guide member 28, and on these members ride roller devices similar to those shown in Figs. 2 and 3, the carriers 30 of which are connected with rulers 34 carrying graduations and arranged to be displaced longitudinally in a common body 35 which is formed with guide grooves and a fixed pointer 36. The cam member 26 has the form of a helix of non-constant pitch which is so formed that the longitudinal movement of translation from this member is proportional to the logarithm of the sine of the angle of sight ($\alpha$). This movement is automatically combined with the longitudinal movement of translation from the cam member 10 of the drum 9 and the motion resulting from the two conversions is converted into motion of the logarithmic altitude scale 34a. The cam member 27 is formed as a helix with non-constant pitch and is so formed that the longitudinal movement of translation from this cam member is proportional to the log of the cosine of the angle of sight ($\alpha$). This movement is automatically combined with a longitudinal movement of translation from the cam member 10 of the cylinder 9 and the movement resulting from the two conversions is converted into a movement of the logarithmic topographic distance scale 34b.

While in the device illustrated in Fig. 1 the drums are arranged concentrically, the distance and position drums may also be arranged side by side, as illustrated in Fig. 5. Here the distance drum 9 is rotated by means of a transmission to the toothed rim 8 of the deviation prism similarly as in the modification described above. Cylinder 9 is formed on its circumference with a cam groove 10 which is formed similarly as the cam members in the modification of Fig. 1. Into the groove 10 extends a feeler (Fig. 4) consisting of a guide roller 37 mounted on a carrier 38 and resting on a side wall of the groove against which it is pressed by supporting rollers 40 which are elastically arranged on a leaf spring 39 so that they can be tilted about the carrier 38'. These rollers 40 rest on the other side wall of the groove. Carrier 38' is inserted in one end of the bar 38, the bent end of which may be supported by a similar feeler device and engages the circular groove 25' formed in the position-drum 25. Bar 38 is displacably arranged in the apparatus, but cannot follow the rotatory movement of the distance-drum 9 nor that of the position-drum 25.

The position-drum 25 is arranged on the supporting drum 13 which is turned in dependency on the change of the position angle. At one end drum 13 is provided with a toothed rim 16 meshing with the pinion 17 of the spindle 18 which is turned by a pinion 21 engaging the toothed rim 22 formed on the stand of the apparatus (see Fig. 1). Transmission of the rotatory movement of the supporting drum 13 onto the position cylinder is effected by means of a key 13' engaging in groove 13″ on the position drum which enables this drum to be displaced.

The rulers 34 (not shown in Fig. 5) are operatively connected with the cam members 26 and 27 and with the circular guide member 28 of the position-drum and these members are arranged in a similar manner as in the example described above.

The apparatus according to the invention operates in the following manner:

The distance of a target is measured by turning the knob 1 (Fig. 1) by means of which the deviation prism 7 is displaced, until the image of the target is under the mark in the field of vision. The turning movement of the knob 1 is simultaneously transmitted by the mitre gear 4, 8 to the distance drum 9 which is provided with guide members 10 formed in such manner that the position-drum 25 is adjusted by the rotation of the distance drum 9 in dependency on the change of the distance expressed in the logarithms of the distance of the target.

The target is kept in the center of the field of vision by turning the casing 60 (Fig. 1) of the range finder around the horizontal axis. During this rotation the pinion 21 rolls on the toothed rim 22 of the stand and its movement is transmitted by the spindle 18 to the second pinion 17 and to the toothed rim 16 of the supporting drum 13, simultaneously and in conformity with the supporting drum 13 also the position-drum 25 rotates. In addition thereto it is displaced axially in dependency on the change of the position of the deviation prism 7 by cooperation of the roller device 29, 30, 31, 32 and 33 with the cam member 10 of the distance cylinder 9.

The resulting movements are transmitted from the guide members 26, 27 and 28 of the cylinder 25 by the guide device 29—33 to the logarithmically divided scales 34a, 34b and 34c, which can be displaced in grooves of the body 35 which is provided with the fixed pointer 36. From the cam member 26 there are transmitted the values of the rotation of the drum 25 in the function of the logarithmic values of the sine of the respective position angle of the target, which by the device described above are directly transmitted to the scale 34a which shows the altitude of the target. If the cam member 10 of drum 23 moves through a distance proportional to log D and if at the same time the drum 25 is rotated through an angle proportional to the position angle α, the cam member 26 will move the scale 34a through a further distance proportional to logarithm sine α. Thus the entire movement of scale 34a will be equal to logarithm D plus logarithm sine α which corresponds to logarithm H, and therefore the scale 34a will directly indicate the altitude H in meters. At the same time the cam member 27 will move the scale 34b a further distance proportional to logarithm cosine α. In consequence of this further movement the total movement of scale 34a will be equal to logarithm D plus logarithm α, i. e., to logarithm L, so that the scale 34b directly indicates the topographic distance of the target in meters. The cam member 27 arranged on the position-drum 25 transmits the rotation of the position-drum 25 in function of the logarithmic values of the cosines of the respective position-angles of the target, which are indicated on the scale 34b which shows the horizontal or topographical distance of the target. The guide member 28 is of circular shape and serves for reading the direct distance of the target on the scale 34c. The results of measurement may thus be read directly from the scales 34a, 34b and 34c with the aid of the fixed pointer 36.

If the ratio of transmission between the position-drum and the adjusting device of the position-angle is made greater than 1:4, the curves 26 and 27 can practically be made steeper, which allows an enlargement of the scope of measurement in comparison with the hitherto known devices of this kind.

The modifications described and illustrated above are only examples of the apparatus according to the invention and the individual details may be changed without departing from the scope of the invention. The use of the new device in connection with a stereoscopic range finder is likewise described only by way of example and the new device can be employed also in connection with other types of range finders, for instance with a range finder with coincidence of the pictures.

I wish it to be understood that I do not desire to be limited to the exact details of construction shown and described for obvious modifications will occur to a person skilled in the art.

I claim:

1. Range finder comprising in combination, a plurality of individually shiftable scales for reading off the rectangular coordinates and the direct distance of the target, a device for adjusting the direct distance of the target, a member positively connected with this device, a second member adapted to be adjusted in dependency on the position angle of the target, a third adjustable member the adjustment of which is controlled by said other two members simultaneously, a plurality of curved controlling cam members on said third member and means for controlling the shift of said scales each in dependency on one of said curved controlling cam members.

2. The range finder of claim 1, in which the third member is a cylinder which is arranged to be adjusted by the first member according to the logarithmic functions of the direct distance of the target and by the second member in direct dependency on the position-angle of the target, two cam members on the circumferential surface of said first member, one formed according to the logarithms of the sines and the other according to the logarithms of the cosines of the position-angle of the target, a scale member associated with each cam member and arranged to be independently controlled thereby, one scale showing the altitude of the target and the other showing its horizontal distance.

3. The range finder of claim 1, in which the third member is a cylinder which is arranged to be adjusted by the first member according to the logarithmic functions of the direct distance of the target and by the second member in direct dependency on the position-angle of the target, a circular guide on the circumferential surface of said first member arranged for controlling the shift of a scale showing the direct distance of the target and two cam members also on the circumferential surface of said first member, one formed according to the logarithm of the sines and the other according to the logarithms of the cosines of the position-angle of the target, for independently controlling the shift of two scales, one showing the altitude of the target and the other showing its horizontal distance.

4. The range finder of claim 1, in which the third member is a hollow cylinder which is arranged to be adjusted by the first member according to the logarithmic functions of the direct distance of the target and by the second member in direct dependency on the position-angle of the target, a circular guide on the circumferential surface of said first member for controlling the shift of a scale showing the direct distance of the target and two cam members also arranged on said circumferential surface, one formed according to the logarithms of the sines and the other according to the logarithms of the cosines of the position-angle of the target, for independently controlling the shift of two scales, one showing the altitude of the target and the other showing its horizontal distance, a common carrier for said three scales which are shiftably arranged thereon, and a pointer on said carrier.

5. Range finder with a self-contained virtual basis for ascertaining the coordinates of an aerial target, which comprises, in combination, a fixed part, a plurality of independently shiftable scales for reading off the rectangular coordinates and the direct distance of the target, a device for adjusting the range finder to accord with the direct distance of the target, a cylinder positively connected with this device, a cam member on the circumferential surface of said cylinder formed according to the logarithms of the direct distance of the target, an adjustable drum adapted to be turned in dependency on the position-angle of the target, a position-drum arranged to be rotated in conformity with said adjustable drum, means arranged for cooperation with said cam member and said position drum for shifting said position-drum in dependency on the rotation of said cylinder, a plurality of cam members on said position-drum and means for causing said scales to be shifted each in dependency on one of said cam members.

6. The range finder of claim 5, in which the cylinder, the adjustable drum and the position-drum are hollow, have different diameters and are coaxially arranged within one another.

7. The range finder of claim 5, in which the cylinder is arranged sideways of and coaxially with the axial drum.

JAN STEKLÍK.